P. M. LINCOLN.
THERMO ELECTRIC AMMETER.
APPLICATION FILED FEB. 12, 1913.

1,142,898.

Patented June 15, 1915.

WITNESSES
J. Herbert Bradley
Jo. Baily Brown

INVENTOR,
Paul M. Lincoln
By F. W. H. Clay
his atty.

UNITED STATES PATENT OFFICE.

PAUL M. LINCOLN, OF PITTSBURGH, PENNSYLVANIA.

THERMO-ELECTRIC AMMETER.

1,142,898.  Specification of Letters Patent.  Patented June 15, 1915.

Application filed February 12, 1913. Serial No. 748,035.

*To all whom it may concern:*

Be it known that I, PAUL M. LINCOLN, a citizen of the United States, residing at Pittsburgh, in the State of Pennsylvania, have invented certain new and useful Improvements in Thermo-Electric Ammeters, of which the following is a specification.

My invention relates to electric current measuring instruments, and its primary object is to provide a simple, accurate, and dependable ammeter, operated by means of a thermo-battery.

I show one embodiment of the invention in the accompanying drawing, wherein—

Figure 1:
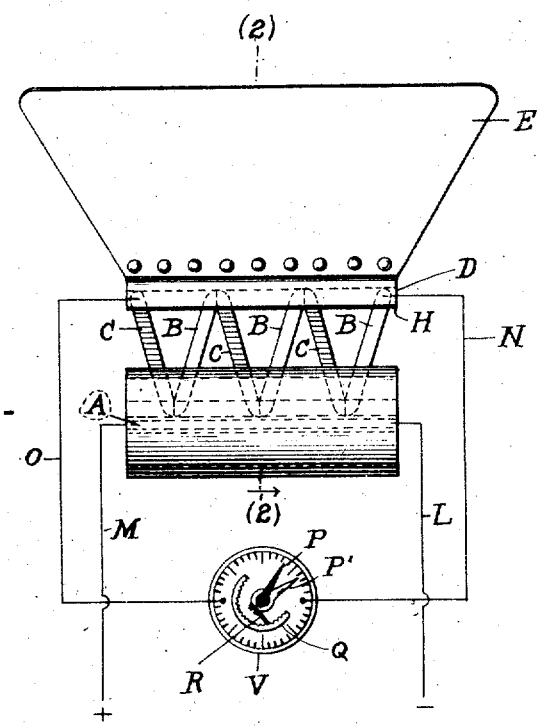
Figure 2:
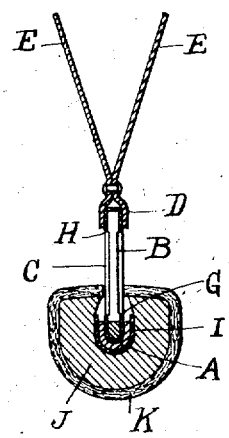

Figure 1 is an elevation, and Fig. 2 is a vertical cross-section.

Thermo-electric batteries have been employed for measuring currents, but they have not been efficient because there has not been provision for radiating the heat from the cold joints, and the thermo-elements have not been properly proportioned, and for other reasons. Briefly I employ a resistance element carrying and heated by the whole or a part of the current to be measured and employ this heat to excite a thermo-battery, and thereupon measure the difference of potential between the terminals of the thermo-battery by means of a voltmeter, which thus indicates the temperature elevation and consequently the amount of current causing it.

As shown in the accompanying drawing, I attach the leads L and M carrying the current to be measured to the two ends of a resistance element A, of material such as iron, manganin, nichrome, etc., which is preferably of U-shape and envelops the hot joints of the thermo-battery comprising the elements B, C. The opposite ends of the elements B, C are embraced by any convenient form of radiator D which is provided with radiating wings E, E. Or I may employ any other form of means to make the radiating surface of the hot ends small compared to the radiating surface of the cold ends. Preferably the radiating wings E, E, are made of copper, and the gripping loops both at D and A may be insulated from the thermo-elements by mica, or other heat resisting insulator as shown at G and H.

The thermo-elements should be in considerable number in order to insure accuracy and positiveness in action; and preferably I make them of copper and constantin, for example, and adjust the cross-sections of the respective elements in inverse proportion to their thermal conductivity. In this case the copper bars B are thinner than the constantin. By this means I secure two advantages; the heat conductivity is uniform for all the elements, and as electric conductivity is proportional to thermal conductivity, the condition of the electric circuits are best.

The terminals of the thermo-battery are connected by leads N and O, as shown, to any convenient form of voltmeter, V, and I prefer to construct this latter instrument of the same material or material having the same temperature co-efficient as the heating or resistance member A, so that the entire apparatus is independent of the temperature of the surrounding atmosphere. That is, as the resistance of the voltmeter windings changes with change of temperature, the resistance of the element A will change in like direction and proportion,—having the same temperature co-efficient. Therefore as the resistance of the voltmeter increases thereby demanding a higher voltage to cause a given indication, the heat lost in the heating element also increases, thereby causing a higher temperature difference between the hot and cold joints of the thermo battery in the same ratio.

Of course, on account of the time required to change the temperature of the element A in operation, there will be a lag in the indication. This time lag I may adjust by the mass of material in the element A. A convenient way to do this is to surround the element A with a mass of metal J to act as a heat reservoir and it is of course electrically insulated, as by strip of mica I. Also in order to prevent escape of heat otherwise than along the bars B and C, I preferably surround the heat reservoir J with a covering of asbestos K. This control over the sluggishness of the instrument is of especial value where it is used to indicate a maximum-demand, because we may thereby adjust the length of time for the heated joints to attain the final temperature corresponding to a given average current. The voltmeter V, in addition to its regular pointer P, has an additional pointer P' which is pushed around by P, but is supplied with a pawl R by which it is retained at its maximum reading by the ratchet Q.

Having thus described my invention and illustrated its use, what I claim is:

1. An electric current meter comprising an element heated by the current to be measured, a heat absorber a radiator connected thereto, a thermo-couple with terminals in thermal contact respectively with said heating element and radiator, and an indicator of voltage in circuit with said thermocouple.

2. An ammeter comprising a heating conductor, a large heat reservoir surrounding the conductor, a thermo-battery with its hot ends embraced by said conductor, a heat radiator attached to the cold ends of the thermo-battery, and a volt meter operated by said thermo-battery, substantially as described.

3. In an ammeter, the combination with a voltmeter, of a thermo couple of a heating element for exciting said thermo-couple, and a heat reservoir surrounding said heating element, and insulated therefrom.

4. The combination with a thermo-electric generator operated by heat produced by a current to be measured, of a heat absorber thereon adapted to suppress effect of temporary variations of current, and a connected voltmeter having a device to indicate the maximum reading of the thermo battery, substantially as described.

In testimony whereof I have hereunto subscribed my name in the presence of the two subscribed witnesses.

PAUL M. LINCOLN.

Witnesses:
  Jo. BAILY BROWN,
  FRED'K STARB.